United States Patent [19]

Miyazaki

[11] Patent Number: 5,168,710
[45] Date of Patent: Dec. 8, 1992

[54] SLUSH HYDROGEN PRODUCTION APPARATUS

[75] Inventor: Jun Miyazaki, Osaka, Japan

[73] Assignee: Iwatani Sangyo Kabushiki Kaisha, Osaka, Japan

[21] Appl. No.: 802,099

[22] Filed: Dec. 4, 1991

[30] Foreign Application Priority Data

Mar. 8, 1991 [JP] Japan .................................... 3-69310

[51] Int. Cl.$^5$ .............................................. F17C 5/00
[52] U.S. Cl. .................................................... 62/541
[58] Field of Search .......................................... 62/54.1

[56] References Cited

U.S. PATENT DOCUMENTS

| 3,455,117 | 7/1969 | Prelowski ........................... | 62/54.1 |
| 3,521,457 | 7/1970 | Hemstreet ........................... | 62/54.1 |
| 3,521,458 | 7/1970 | Huibers et al. ..................... | 62/54.1 |

*Primary Examiner*—Ronald C. Capossela
*Attorney, Agent, or Firm*—Lowe, Price, LeBlanc & Becker

[57] ABSTRACT

The present invention is intended to provide a slush hydrogen production apparatus adapted to efficiently produce slush hydrogen having even particle diameters by means of an industrial procedure. A liquid hydrogen supply/discharge passage (2) is connected to the lower portion of the insulated closed container (1), an exhaust passage (4) and a helium gas supply passage (5) are connected to the upper portion of the insulated closed container (1), a heat exchanger (7) and a vacuum pump (9) are arranged in the exhaust passage (4) in that order from the side of the insulated closed container (1), a stirring means (16) is disposed within the insulated closed container (1) and the stirring means (16) is adapted to be driven from an outside of the insulated closed container (1).

9 Claims, 2 Drawing Sheets

SLUSH HYDROGEN PRODUCTION APPARATUS

BACKGROUND OF THE INVENTION

1. Field of the Invention

The present invention relates to a slush hydrogen production apparatus adapted to produce slush hydrogen including solid hydrogen and liquid hydrogen coexisting with each other.

2. Description of the Prior Art

Conventionally, as the principles of producing such slush hydrogen the following methods are presented as achievements of scientific studies in the international conferences of the cryogenic engineering society or in the 8th world hydrogen energy conference held in Hawaii, 1990. That is, they are an indirect cooling method in which liquid helium is supplied into a cooling jacket of a container containing liquid hydrogen, so as to flow therethrough and to produce solid hydrogen frozen on the inner wall of the container and then the solid hydrogen is scraped off by means of a screw, a direct cooling method in which low-temperature gaseous helium is blown into liquid hydrogen through a helium supply tube so as to produce solid hydrogen at the leading end of the tube, a continuous pressure reduction method in which by supplying liquid hydrogen into a closed container and decreasing a pressure within the closed container not more than its triple point pressure a solid layer of the hydrogen is produced in the surface of the liquid hydrogen, and an intermittent pressure reduction method in which after the solid layer of the hydrogen has been produced on the surface of the liquid hydrogen by decreasing the pressure within the closed container not more than the triple point pressure, the pressure therewithin is increased above the triple point pressure so as to dissolve such portions of the surface solid layer that are in contact with the inner wall surface of the container to sink the solid layer. However, such an apparatus as to enable an efficient mass production of the slush hydrogen by an industrial procedure has not been developed yet.

In the case of the slush hydrogen production by means of the indirect cooling method, since the solid hydrogen frozen on the inner wall of the container is scraped off by means of the screw, there is such a problem that a clearance setting between the inner wall on which the solid hydrogen is produced and the scraping screw is too delicate to even the particle diameters of the solid hydrogen.

In the case of the slush hydrogen production by means of the direct cooling method, since the solid hydrogen is produced at the leading end of the helium supply tube by blowing the low-temperature gaseous helium into the liquid hydrogen, the solid hydrogen to be produced thereat is apt to grow along the flowing direction of the gaseous helium in a tubular manner. Therefore, it is necessary to break the tubular grown solid hydrogen by means of stirs. Also in this case, there is such a problem that uniformalization of the solid particle diameters becomes difficult.

In the case of the slush hydrogen production by means of the continuous pressure reduction method, since the liquid hydrogen is supplied into the closed container and then the pressure within the closed container is decreased not more than the triple point pressure so as to produce the solid layer of the hydrogen in the liquid surface portion, the solid hydrogen is apt to be produced from such a portion of the liquid layer that is in contact with the gas phase as well as from the portions thereof being in contact with the inner peripheral wall of the container. Therefore, though the stirring operation is carried out in the liquid phase portion, it is hard to break the solid layer because the solid layer has been formed along the peripheral wall. There is also such a problem that it is difficult to produce the slush hydrogen throughout the interior of the closed container.

On the one hand, in the case of the slush hydrogen production by means of the intermittent pressure reduction method, since the portion of the frozen solid hydrogen along the container peripheral wall is dissolved by periodically changing over the pressure within the closed container to a pressure not more than the triple point and to a pressure above the triple point so that the solid layer produced on the liquid surface can sink in the liquid due to density difference therebetween, the generation and growth of the solid layer can be enhanced by exposing the liquid surface to the gas phase every certain time (from several seconds to ten and several seconds). But, in this case, since the solid hydrogens are merely sunk into the liquid, there is such a problem that it is difficult to even the diameters of the solid particles in the liquid.

That is, by means of the conventional slush hydrogen production apparatus, it is possible to produce the slush hydrogen but it is difficult to produce such slush hydrogen that includes solid particles of uniform diameters. As a result, it is too long before practical applications of those apparatus. Further, the slush hydrogen production apparatus previously presented in the conference are merely directed mainly to producing the slush hydrogen but a supply of the liquid hydrogen as a raw material and a removal of the slush hydrogen are not considered in these apparatuses.

The present invention is directed to solving such problems, and it is an object of the present invention to provide a slush hydrogen production apparatus which is capable of efficiently producing the slush hydrogen including solid particles of uniform diameters by means of an industrial procedure.

SUMMARY OF THE INVENTION

For accomplishing the above-mentioned object, the present invention resides in a slush hydrogen production apparatus by means of an intermittent pressure reduction method, in which a liquid hydrogen supply/discharge passage is connected to a lower portion of an insulated closed container, an exhaust passage and a helium gas supply passage are connected to an upper portion thereof, a heat exchanger and a vacuum pump are arranged in the exhaust passage in that order from the side of the insulated closed container, a stirring means is disposed within the insulated closed container, and the stirring means is adapted to be driven from an outside of the insulated closed container.

According to the present invention, since in the slush hydrogen production apparatus by means of an intermittent pressure reduction method, a liquid hydrogen supply/discharge passage is connected to a lower portion of an insulated closed container, an exhaust passage and a helium gas supply passage are connected to an upper portion thereof, a heat exchanger and a vacuum pump are arranged in the exhaust passage in that order from the side of the insulated closed container, a stirring means is disposed within the insulated closed container, and the stirring means is adapted to be driven from an outside of the insulated closed container, it is possible to mix particles of solid hydrogen with liquid hydrogen breaking a solid layer by a stirring means when the solid layer is sunk in the liquid hydrogen by lowering a vacuum degree within the insulated container.

Further, thereupon since the solid hydrogen and the liquid hydrogen are stirred, it is possible to even the diameters of the solid hydrogen particles as well as to produce the slush hydrogen that is superior in fluidity.

Since the mixing of the solid and the liquid hydrogens is carried out by the stirring means in that way, the solid particles can be mixed uniformly within the insulated closed container even though the inner diameter of the insulated closed container is large. Therefore, the particles of the solid hydrogen serve as nuclears for next freezing of the liquid hydrogen to facilitate the production rate of the solid hydrogen and to enhance the production efficiency of the slush hydrogen, so that a large amount of slush hydrogen can be produced in a short time.

Furthermore, since the liquid hydrogen supply/discharge passage is connected to the lower portion of the insulated closed container while the exhaust passage and the helium gas supply passage are connected to the upper portion of the insulated closed container, it is possible to carry out efficiently the supply of the liquid hydrogen as the raw material and the discharge of the produced slush hydrogen.

DETAIL DESCRIPTION OF PREFERRED EMBODIMENT

Figure 1:
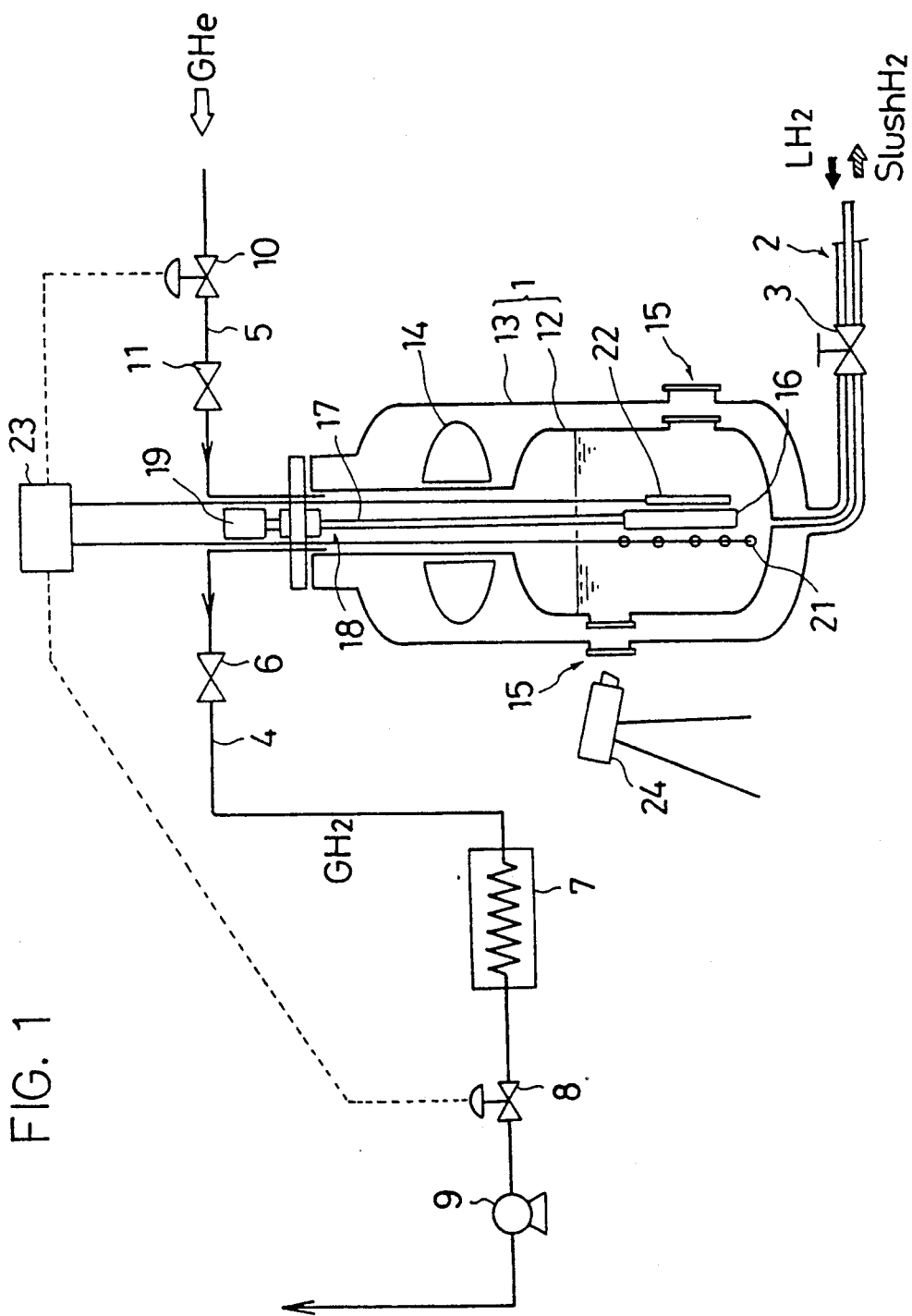
FIG. 1 is a schematic construction view of an apparatus according to the present invention.
Figure 2:
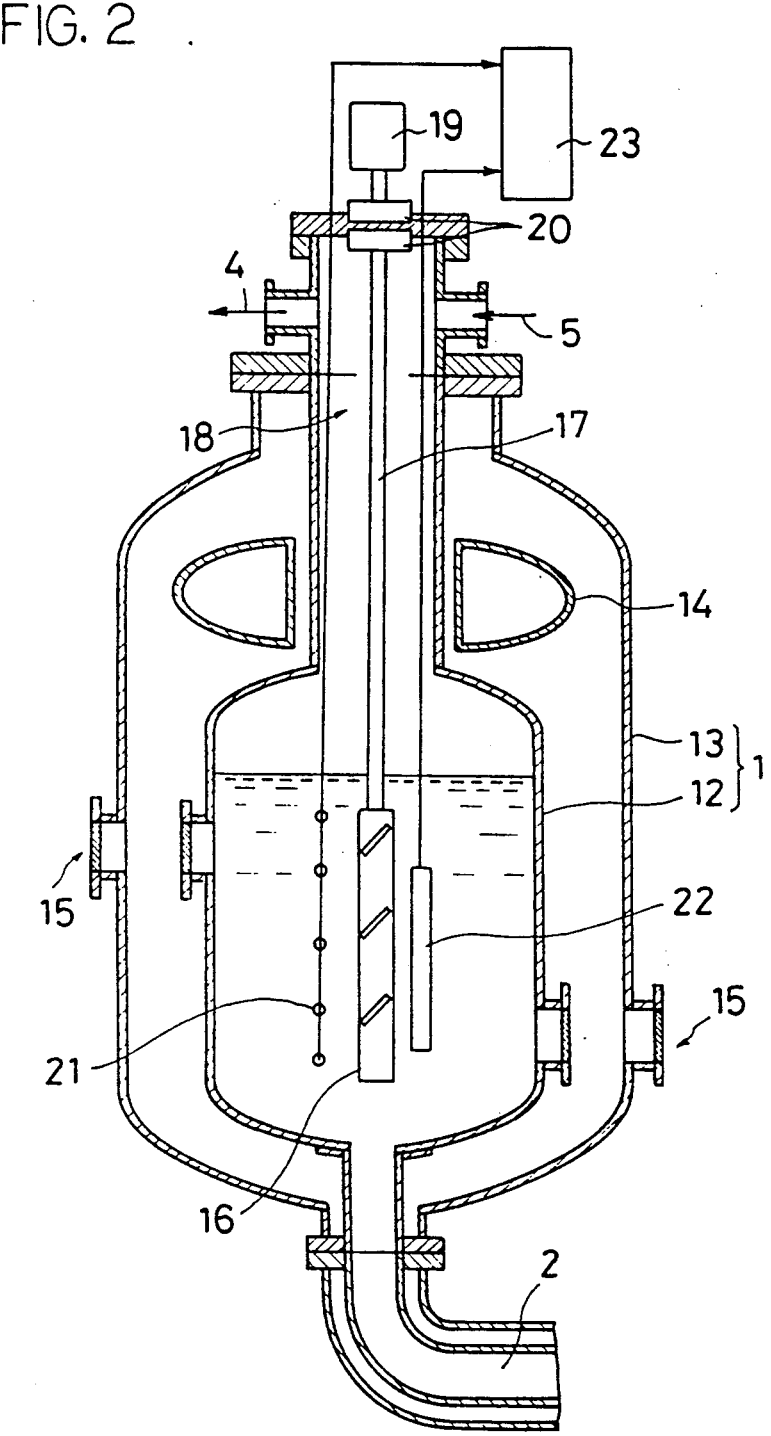
FIG. 2 is a sectional view of an insulated closed container.

In FIGS. 1 and 2, the symbol 1 designates an insulated closed container. Liquid hydrogen is contained within the insulated closed container 1, and slush hydrogen is produced within the insulated closed container 1 by increasing and decreasing a pressure within the insulated closed container 1 near a triple point (7 kPa) pressure of the hydrogen.

To the lower portion of the insulated closed container 1 is connected a liquid hydrogen supply/discharge passage 2 which serves to supply the liquid hydrogen to the interior of the insulated closed container 1 and to discharge the produced slush hydrogen. A liquid hydrogen filling/taking-out valve 3 is disposed in the liquid hydrogen supply/discharge passage 2.

To the upper portion of the insulated closed container 1 are connected an exhaust passage 4 which serves to exhaust gas within the insulated closed container 1 and a helium gas supply passage 5 which serves to supply a pressurizing helium gas into the insulated closed container 1. An opening/closing changeover valve 6, a heat exchanger 7, a flow regulating valve 8 and a vacuum pump 9 are arranged in the exhaust passage 4 in that order from the side of the insulated closed container 1, and a flow regulating valve 10 and a flow passage opening/closing valve 11 are arranged in the helium gas supply passage 5 in that order from the side of a helium supply source (not illustrated).

As shown in FIG. 2, the insulated closed container 1 is of the double container type and has an insulation vacuum space between an inner container 12 and an outer container 13 and a liquid nitrogen storage container 14 disposed for cooling the outer container 13 in the space between the inner and outer containers 12, 13 in order to lessen a temperature difference therebetween. Peep windows 15 are disposed in the respective inner and outer container 12, 13 so as to allow an operator to visually confirm the state of the liquid hydrogen within the inner container 12.

A stirring means 16 is disposed within the inner container 12. A rotary shaft 17 of the stirring means 16 is adapted to be rotated by means of a drive motor 19 disposed outside an upper opening 18 of the insulated closed container 1. The rotary shaft 17 of the stirring means 16 and the output shaft of the drive motor 19 are rotatably coupled to each other under a noncontact condition by means of a coupling device 20 employing magnetic couplers.

A temperature sensing instrument 21 comprising thermocouples and a density measuring instrument 22 are mounted within the inner container 12 of the insulated closed container 1 of the double container type in such a manner as to be immersed in the liquid hydrogen contained therewithin.

Incidentally, in FIGS. 1 and 2, the symbol 23 designates a control device which serves to process output signals of the temperature sensing instrument 21 and the density measuring instrument 22, and the symbol 24 designates a video camera so disposed as to face the peep window 15. The state of the liquid hydrogen can be monitored by means of the video camera 24. An insulating means is applied to the liquid hydrogen supply/discharge passage 2 arranged below the insulated closed container 1.

Then, the producing procedures of the slush hydrogen associated with the slush hydrogen production apparatus will be explained hereinafter.

The liquid hydrogen is supplied through the liquid hydrogen supply/discharge passage 2 into the insulated closed container 1 which has been precooled sufficiently. In this case, since an atmospheric pressure prevails within the insulated closed container 1 before that supply of the liquid hydrogen, a temperature of the supplied liquid hydrogen becomes 20.3K, a pressure therewithin becomes 101.4 kPa and a density of the supplied liquid hydrogen becomes 0.81 kg/m$^3$. By operating the vacuum pump 9 so as to discharge the hydrogen gas from the insulated closed container 1 after the exhaust passage 4 has been opened, the pressure within the insulated closed container 1 is decreased to 7.3 kPa as the triple point pressure of the hydrogen. Thus, the liquid hydrogen starts to freeze in its surface portion and in its portion being in contact with the wall surface of the inner container 12. At that time, the temperature of the liquid hydrogen is 13.8K and the density thereof is 77.06 kg/m$^3$ while the temperature of the solid hydrogen 13.8K and the density thereof is 86.67 kg/m$^3$.

Then, when a certain time (around 10 seconds) has passed after the pressure reduction, the opening/closing changeover valve 6 is closed to increase the interior pressure of the insulated closed container 1 a little so that the interior pressure increases above the triple point pressure. Therefore, the portion of the frozen hydrogen being in contact with the wall surface melts owing to a heat supply from the container wall, and then the surface portion thereof composed of the frozen solid hydrogen sinks in the liquid hydrogen as it is. Thereupon, since the stirring means 16 operates within the insulated closed container 1, the frozen solid hydrogen is fragmented into small pieces of solid hydrogen, which are mixed with the liquid hydrogen.

When a certain time (around 10 seconds) has passed after a lowering of the vacuum degree, the opening/closing changeover valve 6 in the exhaust passage 4 is opened again to effect an exhaust from the insulated closed container 1 and to decrease the interior pressure of the container 1 to the triple point pressure, so that the solid hydrogen can be produced again in the surface portion of the liquid hydrogen. When the completion of the production of the slush hydrogen is confirmed by a visual inspection through the peep window 15 or the density of the liquid hydrogen detected by the density measuring instrument 22 immersed in the liquid hydrogen within the insulated closed container 1 becomes an intermediate value (for example, 81.54 kg/m$^3$) involved between the liquid hydrogen density (77.06 kg/m$^3$) at the triple point temperature and the solid hydrogen density (86.67 kg/m$^3$) by repeating these procedures, the pressure within the insulated closed container 1 is set aside for several hours to maintain the triple point pressure. In that case, the reason why it is set aside for several hours is that the solid hydrogen particles have horns which badly affect their fluidities just after their production but the horns are removed from the solid hydrogen particles so that their configurations will be changed to that which doesn't badly affect their fluidities when several hours have passed after their production.

After the lapse of that time for setting aside, the flow regulating valve 10 of the helium gas supply passage 5 is opened and the liquid hydrogen filling/taking-out valve 3 of the liquid hydrogen supply/discharge passage 5 is opened, so that the pressurizing helium gas is supplied into the insulated closed container 1 and then the sherbet-like slush hydrogen is taken out thereof.

As many different embodiments of the invention will be obvious to those skilled in the art, one of which has been disclosed or referred to herein, it is to be understood that the specific embodiment of the present invention as presented herein is intended to be by way of illustration only and is not limiting on the invention, and it is to be understood that such embodiments, changes, or modifications may be made without departing from the spirit and scope of the invention as set forth in the claims appended hereto.

What is claimed is:

1. A slush hydrogen production apparatus for producing slush hydrogen by repeating freezing and melting liquid hydrogen, comprising:
    an insulated closed container for containing liquid hydrogen;
    a liquid hydrogen supply/discharge passage connected to a lower portion of said insulated closed container;
    a gaseous hydrogen exhaust passage and a helium gas supply passage respectively connected to an upper portion of said insulated closed container;
    a heat exchanger and a vacuum pump sequentially arranged in said exhaust passage in that order with respect to said insulated closed; and
    stirring disposed within said insulated closed container and adapted to be driven from outside said insulated closed container,
    wherein said heat exchanger and said vacuum pump are operable intermittently to manipulate a pressure of said liquid hydrogen to thereby freeze and partially unfreeze a portion of said liquid hydrogen to accumulate a quantity of frozen hydrogen in said bottom portion of said insulated closed container, and
    said stirring means is operable to mix said quantity of frozen hydrogen with said liquid hydrogen to form a hydrogen slush.

2. A slush hydrogen production apparatus according to claim 1, wherein,
    said insulated closed container has a double walled structure, comprising an inner container and outer container that encloses said inner container, with a vacuum insulating space between said inner and outer containers, and a liquid nitrogen storage device disposed in said vacuum insulating space for cooling the outer container.

3. A slush hydrogen production apparatus according to claim 2, wherein
    said inner and outer containers are provided with corresponding viewing windows, to facilitate viewing of the state of the liquid and solid hydrogen within said inner container.

4. A slush production apparatus according to claim 1, wherein,
    said helium gas supply passage provides pressurized helium to discharge said hydrogen slush from said insulated container through said supply/discharge passage.

5. A slush production apparatus, comprising:
    a vessel for holding a material in its solid, liquid, and gaseous forms;
    means for evacuating from said vessel a portion of said gaseous form so as to convert a portion of said material from said liquid form into said solid form; and
    means for mixing a portion of said material that is in said liquid and solid forms so as to form a slush.

6. A slush production apparatus according to claim 5 further comprising:
    means for discharging said slush from said vessel by applying another gaseous material under pressure to said slush within said vessel.

7. A method for producing a hydrogen slush in an insulated container formed for holding hydrogen in its solid, liquid and gaseous phases, comprising the steps of:
    intermittently reducing a pressure of said hydrogen to convert a portion thereof to said solid phase at an inside surface of said container;
    controllably increasing said pressure for a predetermined time to release said solid phase from said surface to allow the same to mingle with said liquid phase; and
    mixing said solid and said liquid hydrogen phases to produce a slush combination of solid and liquid hydrogen.

8. A method for producing a slush combination according to claim 7, comprising the further step of:
    maintaining said slush at a triple point pressure to thereby cause removal of a plurality of protrusions that form on particles of said solid phase hydrogen during the production of said slush, to thereby enhance fluidity of said slush.

9. A method for producing a slush combination according to claim 7, comprising the further step of:
    delivering a pressurized gaseous form of material into said insulated container to pressurize and discharge said slush from said insulated container.

* * * * *